United States Patent
Milligan

[15] 3,639,262
[45] Feb. 1, 1972

[54] EMULSIFYING AGENTS

[72] Inventor: John G. Milligan, Austin, Tex.

[73] Assignee: Jefferson Chemical Company, Inc., Houston, Tex.

[22] Filed: June 5, 1968

[21] Appl. No.: 734,558

Related U.S. Application Data

[63] Continuation of Ser. No. 420,179, Dec. 21, 1964, abandoned.

[52] U.S. Cl. ..............................252/355, 252/312, 424/170, 424/171

[51] Int. Cl. ..................A01n 17/10, B01f 17/12, B01j 13/00

[58] Field of Search ..................252/355; 424/170, 171; 71/3

[56] References Cited

UNITED STATES PATENTS

| | | | |
|---|---|---|---|
| 2,217,207 | 10/1940 | Horst | 260/570 X |
| 2,898,267 | 8/1959 | Lindner | 252/355 X |
| 3,247,206 | 4/1966 | Yost et al. | 260/268 |
| 3,284,187 | 11/1966 | Lindner | 252/355 X |

*Primary Examiner*—Richard D. Lovering
*Attorney*—Carl G. Ries, John R. Kirk, Jr. and H. G. Jackson

[57] ABSTRACT

An emulsifying agent for use in the preparation of water dispersible toxicant solutions which is storage stable on standing and which consists essentially of a mixture of an anionic surface active agent component and a nonionic surface active agent component, viz., an ethylene oxide adduct of an alkylphenol; the anionic component consisting essentially of amine salt of alkyl aromatic sulfonic acid; the amine being a diamine or triamine wherein the amine groups are separated by carbon atoms, oxygen atoms and/or very weakly basic nitrogen atoms, at least five in number.

8 Claims, No Drawings

3,639,262

EMULSIFYING AGENTS

CROSS-REFERENCE TO RELATED APPLICATION

This application is a continuation of application Ser. No. 420,179 filed Dec. 21, 1964, now abandoned.

This invention is concerned with improved emulsifying agents for use in the preparation of water dispersible toxicant solutions. More particularly, this invention is concerned with improved emulsifying agents containing amine salts.

In recent years, the use of toxicants in the control or elimination of various pests, including insects, rodents, plants and fungi, has become commonplace. Many of these toxicants are commonly supplied in the form of concentrated solutions in organic solvents, which solutions are mixed with water prior to use. To facilitate mixing with water, emulsifying agents are included in the solutions.

In the past, emulsifying agents consisting of mixtures of anionic and nonionic emulsifiers have been found to be most satisfactory in this service. The anionic emulsifier is usually a salt of an alkyl aromatic sulfonic acid. The use of alkaline earth metal salts results in rapid dispersion; however, a sludge is sometimes formed in the toxicant solution. In U.S. Pat. No. 2,898,267, it was reported that this sludge formation may be avoided by the use of an amine salt wherein the amine is a polyamine containing two to four carbon atoms between the amine groups. However, these amine salts are not completely satisfactory, since the dispersions obtained are unstable and tend to separate into aqueous and organic components on standing. Separation of the dispersion results in uneven application of the toxicant with some areas receiving too much toxicant and some receiving too little toxicant.

I have now discovered that satisfactory, stable dispersions can be obtained when the emulsifying agent is a mixture of a nonionic and an amine salt of an alkylaryl sulfonic acid wherein the amine is selected from the group consisting of di- and triamines wherein the amine groups are separated by at least five atoms selected from the group consisting of carbon atoms, oxygen atoms and very weakly basic nitrogen atoms.

Toxicants, organic solvents and nonionic emulsifiers that may be used are well known to those skilled in the art and are described, for example, in U.S. Pat. No. 2,898,267. Among the more widely used and preferred nonionic emulsifiers are ethylene oxide adducts of alkylphenols, such as, for example, ethylene oxide adducts of nonylphenol. These components are used in conjunction with the anionic emulsifiers of the present invention, all in accordance with known procedures.

The anionic component of the present emulsifier is an amine salt of an alkylaryl sulfonic acid wherein the amine is selected from the group consisting of di- and triamines wherein the amine groups are separated by at least five atoms selected from the group consisting of carbon atoms, oxygen atoms and very weakly basic nitrogen atoms. Specific examples of acceptable amines include 4,4'-methylenebis-(N,N-dimethylaniline), 1-(2-aminoethyl)piperazine, 1,4-cyclohexanebis(methylamine), ethyleneureabis(propylamine), Mannich bases such as those obtained by the reaction of phenol, formaldehyde and 2 or 3 mols of diethanolamine and polymeric materials containing polyoxyalkylene chains terminated with amino groups. The latter materials include amino terminated polyglycols such as, for example, polypropyleneglycoldiamine having a molecular weight of about 500 and alkylene oxide adducts of triols wherein the polyoxyalkylene chains have been terminated with amine groups such as, for example, an amino terminated propylene oxide adduct of glycerine having a molecular weight of about 380. It is to be understood that amines based on other polyglycols and trifunctional alkylene oxide adducts may also be used. The preferred amines for use in my invention are 4,4'-methylenebis(N,N-dimethylaniline) and 1-(2-aminoethyl)piperazine.

By very weakly basic nitrogen atoms, I mean nitrogen atoms that will not form salts in aqueous solutions at a pH above 2. The tertiary nitrogen atom of 1-(2-aminoethyl)piperazine is of this type. It is not titrated in aqueous solution by dilute hydrochloric acid. An amine group that is so weakly basic that it does not form a salt with an acid will not act to neutralize the alkyl aromatic sulfonic acid employed in the present invention and, for purposes of this invention, may not be considered as an amine group.

The advantages of the present emulsifiers will be further illustrated by example I.

EXAMPLE I

A series of emulsifiers prepared from various amines were screened by the following procedure: The indicated amount of various components, as listed in table 1, were mixed. 90 ml. of distilled water was added and the mixture was shaken on a Atlab shaker for 30 seconds. The emulsion was immediately poured into a calibrated tube in the Atlab Emulsion Viewer and was examined at intervals for any separation. The emulsion was rated by the system used by Brown & Riley [Agricultural Chemicals 14, No. 8, 34 (1955)]. The results are tabulated in table 1. The first number in each column of the ratings represents the time given in minutes with the exception of the last column, in which the times are in hours. The second number in each column of the ratings represents the percent of separation of the emulsion. The letter $t$ following the number indicates that an oil-rich phase rose to the top in the tube. The rating marked "indef." indicates that there was not much difference in the appearance of the two layers. The rating marked "oil" indicates that free oil particles were observed.

In general, the anionic emulsifiers employed were obtained by the addition of an amine to a solution of dodecylbenzenesulfonic acid in the solvent. Anionic A was obtained form 1,3-propanediamine, a prior art amine. Anionic B was obtained from a polypropyleneglycoldiamine of 500 molecular weight. Anionic C was obtained from 4,4'-methylenebis(N,N-dimethylaniline). Anionic D was obtained from cyclohexane-bis(methylamine). Anionic E was obtained from methylenedianiline. Anionic F was obtained from 1-(2-aminoethyl)-piperazine. Anionic F was obtained from 1-(2-aminoethyl)-piperazine. The nonionic emulsifiers employed were SURFONIC N-95, which is the 9.5-mol ethylene oxide adduct of nonylphenol and SURFONIC N—120, which is the 12-mol ethylene oxide adduct of nonylphenol. The solvent employed was a technical grade of xylene.

TABLE 1.—SCREENING OF EMULSIFIERS

| Grams | Component | Ratings | | | |
|---|---|---|---|---|---|
| 0.2 | Anionic A | 10-17 | 60-38t | 120-38t | |
| 0.2 | Surfonic ® N-95 | | | | |
| 9.6 | Solvent | | | | |
| 0.2 | Anionic B | 10-0 | 90-0 | 120-0 | 66 hrs.-0. |
| 0.2 | Surfonic ® N-95 | | | | |
| 9.6 | Solvent | | | | |
| 0.2 | Anionic C | 10-1 | 60-0 | | 24 hrs.-1 oil. |
| 0.2 | Surfonic ® N-95 | | | | |
| 9.6 | Solvent | | | | |
| 0.2 | Anionic D | 10-0 | 60-0 | 120-0 | 20 hrs.-0. |
| 0.2 | Surfonic ® N-95 | | | | |
| 9.6 | Solvent | | | | |
| 0.1 | Anionic C | 10-0 | 60-0 | 120-0 | 24 hrs.-0. |
| 0.1 | Anionic E | | | | |
| 0.4 | Surfonic ® N-120 | | | | |
| 9.4 | Solvent | | | | |
| 0.2 | Anionic C | 10-0 | 60-0 | 120-0 | 22 hrs.-0. |
| 0.2 | Surfonic ® N-120 | | | | |
| 9.6 | Solvent | | | | |
| 0.1 | Anionic F | 10-0 | 60-0 | 120-0 | 18 hrs.-0. |
| 0.3 | Surfonic ® N-95 | | | | |
| 9.4 | Solvent | | | | |
| 0.32 | Anionic C | 10-0 | 60-0 | 120-0 | 24 hrs.-0. |
| 0.2 | Surfonic ® N-120 | | | | |
| 2.0 | DDT | | | | |
| 5.2 | Solvent | | | | |
| 0.2 | Anionic C | 10-0 | 60-0 | 120-0 | 24 hrs.-0. |
| 0.2 | Surfonic ® N-120 | | | | |
| 2.0 | DDT | | | | |
| 5.2 | Solvent | | | | |

| | | | | | |
|---|---|---|---|---|---|
| 0.15 | Anionic C | | | | |
| 0.15 | Surfonic ® N-120 | 10-0 | 60-0 | 120-0 | 24 hrs.-0. |
| 2.0 | DDT | | | | |
| 5.2 | Solvent | | | | |
| 0.31 | Anionic C | | | | |
| 0.31 | Surfonic ® N-120 | 10-0 | 60-0 | 120-0 | 24 hrs.-0. |
| 7.4 | Chlordane | | | | |
| 2.0 | Solvent | | | | |
| 0.5 | Anionic C | | | | |
| 0.5 | Surfonic ® N-120 | 10-0 | 60-0 | 120-0 | |
| 5.5 | 90% Malathion | | | | |
| 3.5 | Solvent | | | | |

¹ Indef.

In many of the early screening tests, only a solvent was employed with no toxicant. However, in later tests, three commonly used insecticides were employed with the solvent.

To be satisfactory, an emulsion stable for at least 120 minutes should be obtained. It should be noted that when Anionic A, prepared form a prior art amine, was employed there was separation of the emulsion within 10 minutes. It was completely unexpected that the use of a larger amine in accordance with the present invention would result in a stable emulsion. In one case, there was no separation after 66 hours.

Having thus described my invention, I claim:

1. An emulsifying agent for use in the preparation of water dispersible toxicant solutions which emulsifying agent consists essentially of an ethylene oxide adduct of an alkylphenol and an amount to effect a stable dispersion of an anionic component which consists essentially of an amine salt of an alkyl aromatic sulfonic acid, wherein the amine is 1-(2-aminoethyl)piperazine.

2. An emulsifying agent for use in the preparation of water dispersible toxicant solutions which emulsifying agent consists essentially of an ethylene oxide adduct of nonyl phenol and an amount to effect a stable dispersion of an anionic component which consists essentially of an amine salt of an alkyl aromatic sulfonic acid, wherein the amine is 1-(2-aminoethyl)piperazine.

3. An emulsifying agent for use in the preparation of water dispersible toxicant solutions which emulsifying agent consists essentially of an ethylene oxide adduct of an alkyl phenol and an amount to effect a stable dispersion of an anionic component which consists essentially of an amine salt of an alkyl aromatic sulfonic acid, wherein the amine is a polyoxyalkylenediamine or alkylene oxide adducts of triols wherein the polyoxyalkylene chains are terminated with amine groups.

4. An emulsifying agent as in claim 3 wherein the ethylene oxide adduct of an alkyl phenol is an ethylene oxide adduct of nonyl phenol.

5. An emulsifying agent as in claim 3 wherein the amine is a polyoxyalkylenediamine.

6. An emulsifying agent as in claim 4 wherein the amine is a polyoxyalkylenediamine.

7. An emulsifying agent as in claim 3 wherein the amine is a polyoxypropylenediamine.

8. An emulsifying agent as in claim 4 wherein the amine is a polyoxypropylenediamine.

* * * * *